United States Patent
Foster

(10) Patent No.: US 6,199,311 B1
(45) Date of Patent: Mar. 13, 2001

(54) SCENT PELLET AND METHOD

(76) Inventor: Wes Foster, 2769 Capital Cir., NE. Tallahassee, FL (US) 32308

(*) Notice: Subject to any disclaimer, the term of this patent is extended or adjusted under 35 U.S.C. 154(b) by 0 days.

(21) Appl. No.: 09/307,483

(22) Filed: May 10, 1999

(51) Int. Cl.[7] ............................ A01M 31/00; F42B 12/40
(52) U.S. Cl. ............................... 43/1; 102/506; 102/513; 119/711
(58) Field of Search ................ 43/1, 124, 132.1; 102/502, 506, 512, 513; 119/711, 710, 709, 707, 174

(56) References Cited

U.S. PATENT DOCUMENTS

| | | | | |
|---|---|---|---|---|
| 2,086,631 | * | 7/1937 | Munro | 119/711 |
| 4,853,131 | * | 8/1989 | Etani | 210/696 |
| 4,907,567 | * | 3/1990 | Henrich | 124/89 |
| 5,001,880 | * | 3/1991 | Smith | 53/453 |
| 5,018,450 | * | 5/1991 | Smith | 102/513 |
| 5,033,446 | * | 7/1991 | Bradt | 124/26 |
| 5,064,073 | * | 11/1991 | Folland | 220/521 |
| 5,254,379 | * | 10/1993 | Kotsiopoulos et al. | 428/35.7 |
| 5,303,496 | * | 4/1994 | Kowalkowski | 43/1 |
| 5,353,712 | * | 10/1994 | Olson | 102/513 |
| 5,456,036 | * | 10/1995 | Butz | 43/1 |
| 5,516,098 | * | 5/1996 | Aiello | 473/594 |
| 5,624,332 | * | 4/1997 | Dalton et al. | 473/354 |

* cited by examiner

*Primary Examiner*—Michael J. Carone
*Assistant Examiner*—James S. Bergin
(74) *Attorney, Agent, or Firm*—Peter Loffler

(57) ABSTRACT

A scent pellet that is used by hunters to dispel a game scent into a desired area without leaving a human scent has a pair of hemispherical body members that are coupled together. A game scent is introduced into the pellet through a capped opening located on one of the body members. The pellet is propelled, by way of a compressed gas gun, a slingshot, or by throwing, into the desired area such that the pellet strikes a relatively hard object. Some of the game scent is released through the opening during pellet flight. The pellet is constructed of a material that will break the pellet up upon striking the object thereby releasing the game scent. The pellet can be constructed from a biodegradable material.

9 Claims, 4 Drawing Sheets

SCENT PELLET AND METHOD

BACKGROUND OF THE INVENTION

1. Field of the Invention

The present invention relates to a pellet used to hold a game scent and a method to dispel the game scent within a desired hunting area.

2. Background of the Prior Art

Conventional methods of applying game scent, require a hunter to walk to a given location and apply the scent by tying a scent-laden strip of cloth to a tree or bush or by actually applying the scent to active scrapes or rubs. This method requires the hunter to walk to each location to be scented. This causes human scent, which repels game, to be left across the area traversed including possibly the game trail. As such, this method has the potential of repelling, as opposed to attracting game.

Therefore, there is a need in the art for a way to deposit game scent within a given area without leaving undesirable human scents in the process. The process must be relatively simple and straightforward.

SUMMARY OF THE INVENTION

The scent pellet and method of the present invention address the aforementioned needs in the art. The present invention provides for a relatively simple and straightforward device that allows a hunter to quickly and easily deposit a desired game scent, without having to traverse an area and thus deposit undesirable human scents.

The scent pellet and method of the present invention comprise a pellet made from a first hemispherical body member that has a first outer periphery and a first flange extending along the outer periphery, and a second hemispherical body member having a second outer periphery with a plurality of legs, each having a one-way ramp adapted to engage the flange. The first body member and second body member are made from any appropriate material such that upon impact with a relatively hard object such as a tree or a rock, the body members with break. This material may also be biodegradable. Additionally, the weight of the second body member can be greater than the weight of the first body member to enhance distance of travel of the pellet and to give the pellet spin during flight. A game scent, such as doe estrous, doe urine, buck urine, skunk urine, fox urine, and bobcat urine or any other appropriate game scent, is disposed within the scent pellet. The game scent can be introduced into the pellet through an opening, which may be capped, located on one or both of the body members. The scent may be introduced by first drawing the scent into a syringe and thereafter placing the syringe into the pellet through the opening and discharging the contents of the syringe into the pellet. The pellets can be packaged with multiple pellets per pack and can include a syringe within the pack.

Once a pellet is filled with the desired game scent, the pellet is propelled into the desired area so that the pellet strikes a relatively hard object and breaks thereby discharging the scent held within. During flight, the pellet will leak some of the scent through the opening thereby discharging some scent along the flight path. Propulsion of the pellet can be accomplished by simply throwing the pellet or by shooting the pellet from a compressed gas gun—such as typical paint ball gun or by shooting the pellet from a slingshot.

BRIEF DESCRIPTION OF THE DRAWINGS

Similar reference numerals refer to similar parts throughout the several views of the drawings.

DESCRIPTION OF THE PREFERRED EMBODIMENT

Figure 1:
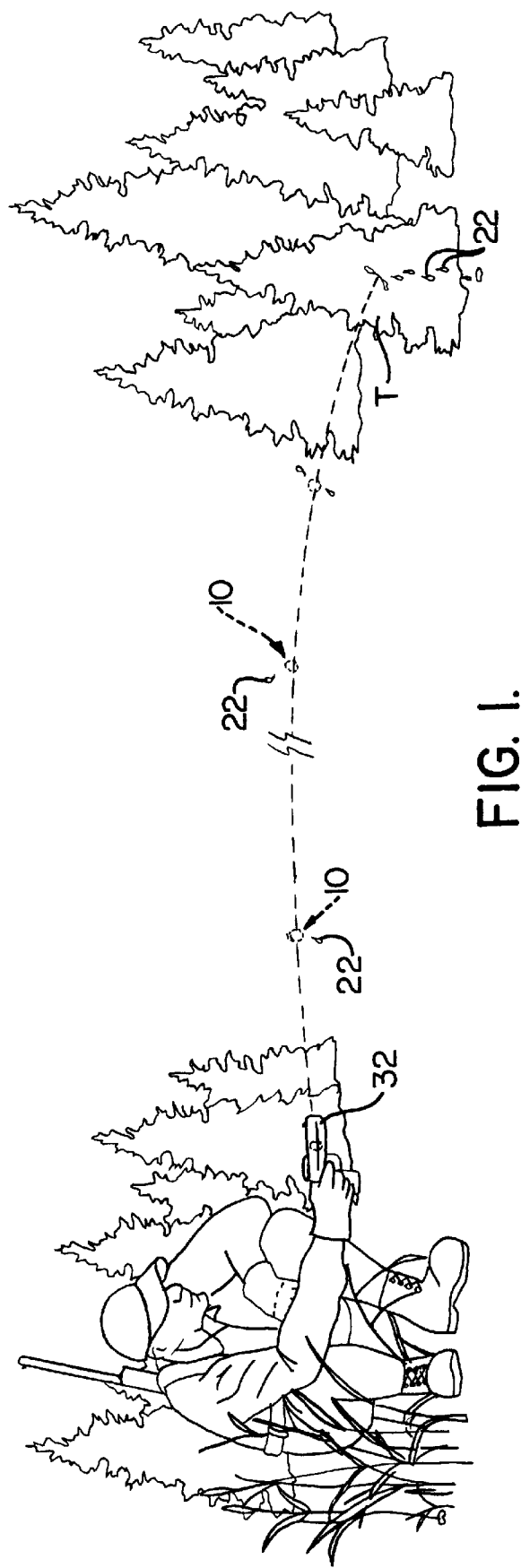
FIG. 1 is an environmental view of the scent pellet and method of the present invention.
Figure 2:
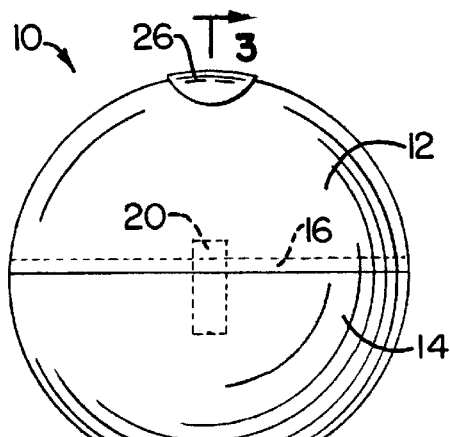
FIG. 2 is an elevation view of the scent pellet of the present invention.
Figure 3:
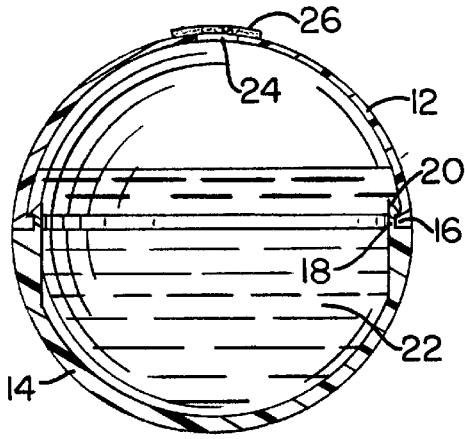
FIG. 3 is a sectioned view of the scent pellet taken along line 3—3 in FIG. 2.
Figure 4:
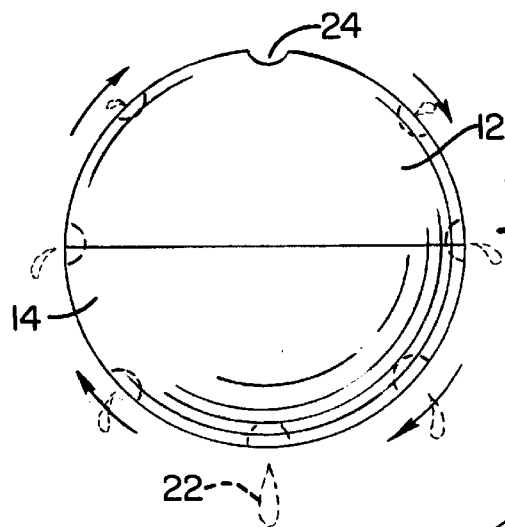
FIG. 4 is an elevation view of the scent pellet in flight.
Figure 5:
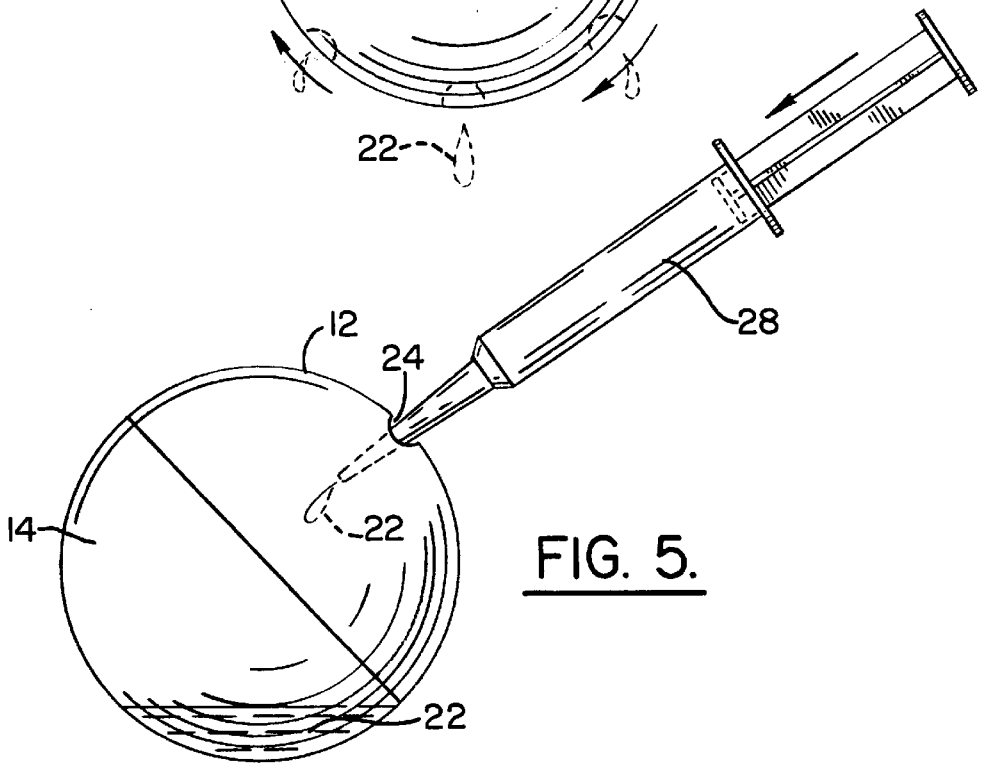
FIG. 5 is an elevation view of the scent pellet being filled with game scent.
Figure 6:
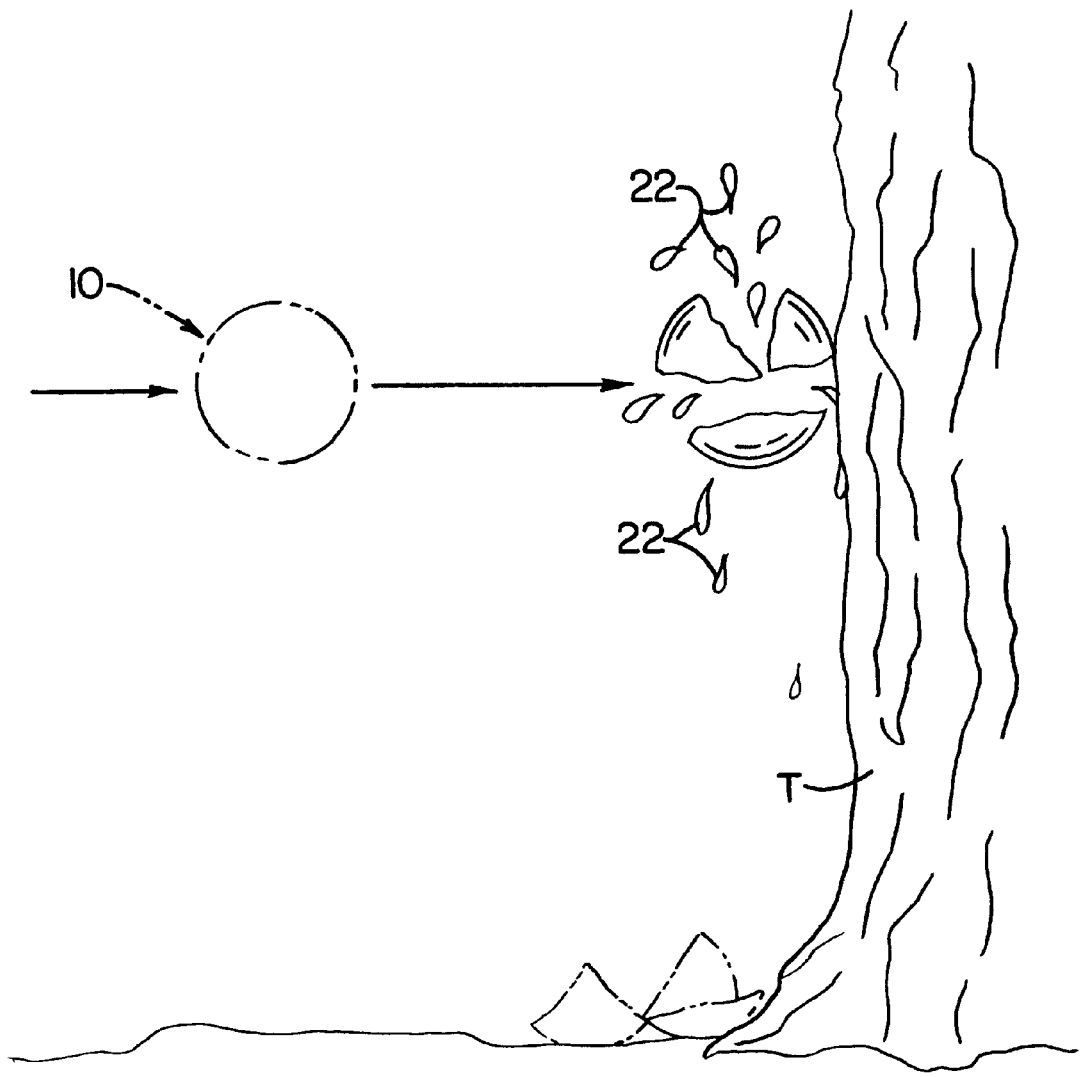
FIG. 6 is an environmental view of the game pellet through the latter stages of flight.
Figure 7:
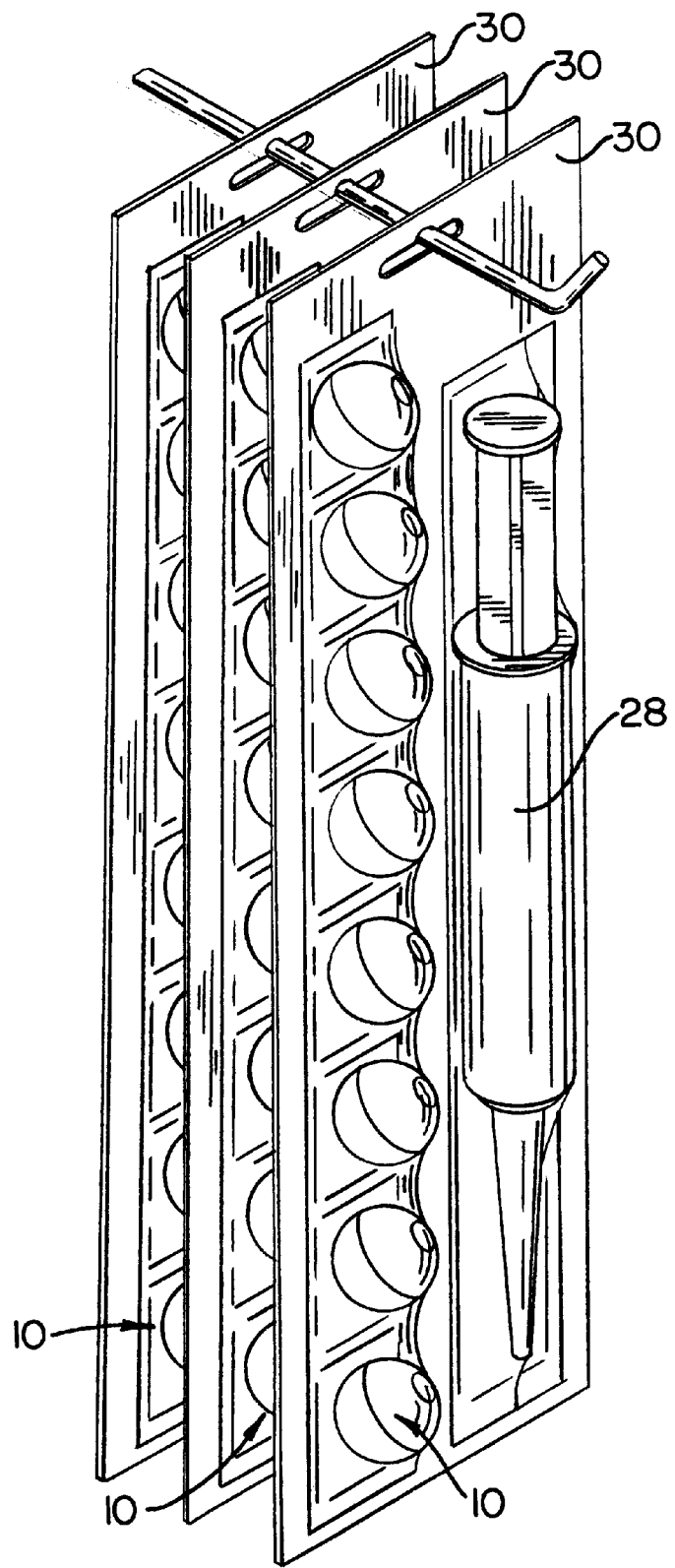
FIG. 7 is a perspective view of a possible packaging method of the scent pellet system.

Referring now to the drawings, it is seen that the scent pellet of the present invention, generally denoted by reference numeral 10, is comprised of a pellet that is made from a first hemispherical body member 12 and a second hemispherical body 14. The first body member 12 has a first outer periphery that has a first flange 16 extending along this outer periphery, while the second body member 14 has a second outer periphery with a plurality of legs 18, each having a one-way ramp 20 and adapted to engage the flange 16. The two body members 12 and 14 are brought together with the outer periphery of the first body member 12 abutting the outer periphery of the second body member 14. The one-way ramps 20 of each of plurality of legs 18 pass over the flange 16 of the first body member 12 and thereafter engage the underside of the flange 16, thereby providing a secure and snug fit of the two body members 12 and 14 to one another. The legs 18 are sufficiently resilient to bend backwardly when passing over the flange 16 of the first body member 12 and thereafter to return to original position after they have passed the flange 16. The first body member 12 and second body member 14 are made from any appropriate material such that upon impact with a relatively hard object such as a tree T or a rock, the body members 12 and 14 with break. The material used to make the first body member 12 and the second body member 14 may also be biodegradable. The weight of the second body member 14 can be greater than the weight of the first body member 12 to enhance distance of travel of the pellet 10 when it is propelled and to give the pellet 10 spin during flight.

A game scent 22, such as doe estrous, doe urine, buck urine, skunk urine, fox urine, and bobcat urine or any other appropriate game scent 22, is disposed within the pellet 10. The game scent 22 chosen may be geographic specific. The game scent 22 can be introduced into the pellet through an opening 24, which may have a cap 26 removably secured thereon, the opening 24 located on either the first body member 12 or the second body member 14 or both. The game scent 22 may be introduced by first drawing the game scent 22, from an appropriate container (not illustrated) into a syringe 28 and thereafter placing the syringe 28 into the pellet 10 through the opening 24 and discharging the contents of the syringe 28 into the pellet 10. The pellets 10 can be packaged with multiple pellets 10 per pack 30 and including a syringe 28 within the pack 30.

Alternately, the game scent 22 can be placed into the pellet 10 during manufacture and the game scent-laden pellet packaged as such. Of course, in such a configuration, if an opening 24 is located on the pellet 10, the opening 24 will need to have the cap 26 placed thereover for shipment.

Once a pellet 10 is filled with the desired game scent 22, the pellet 10 is propelled (without replacing the cap 26 onto the opening 24 or first removing the cap 26 if the cap 26 is thereon) into the desired area so that the pellet 10 strikes a relatively hard object such as the illustrated tree T and breaks thereby discharging the game scent 22 held within. During flight, the pellet 10 will leak some of the game scent 22 through the opening 24 thereby discharging some scent along the flight path. Propulsion of the pellet 10 can be accomplished by simply throwing the pellet 10 or by shooting the pellet 10 from a compressed gas gun 32—such as illustrated paint ball gun—or by shooting the pellet 10 from a slingshot.

While the invention has been particularly shown and described with reference to an embodiment thereof, it will be appreciated by those skilled in the art that various changes in form and detail may be made without departing from the spirit and scope of the invention.

I claim:

1. A method of releasing a game scent comprising the steps of:

providing a pellet;

placing a game scent into the pellet;

propelling the pellet such that the pellet strikes an object and breaks as a result of the strike; and wherein the pellet is comprised of a first hemispherical body member having a first outer periphery and a first weight; a first flange extending along the outer periphery; a second hemispherical body member having a second outer periphery and a second weight which is greater than the first weight; a plurality of legs, each having a one-way ramp, the ramp adapted to engage the flange; and said game scent disposed within the scent pellet.

2. The method of claim 1 wherein the pellet has at least one opening therein.

3. The method as in claim 2 wherein the game scent is placed into the pellet through the at least one opening by way of a syringe.

4. The method as in claim 2 wherein each of the at least one opening has a cap removably secured thereto.

5. The method as in claim 1 wherein the game scent is selected from the group consisting of doe estrous, doe urine, buck urine, skunk urine, fox urine, and bobcat urine.

6. The method as in claim 1, wherein the pellet is propelled by using a compressed gas gun or a slingshot.

7. The method as in claim 1 wherein the pellet is propelled by using a slingshot.

8. The method as in claim 1 wherein the first body member and the second body member are each made from a biodegradable material.

9. The method as in claim 1 wherein the first weight is different than the second weight.

\* \* \* \* \*